F. D. LEACH.
FRICTION GEARING.
APPLICATION FILED MAY 9, 1910.

1,028,944.

Patented June 11, 1912.
3 SHEETS—SHEET 1.

Witnesses:
Ira D. Perry
D. Lewis.

Inventor:
Floyd D. Leach
By Buckley Durand Drury
Attys.

F. D. LEACH.
FRICTION GEARING.
APPLICATION FILED MAY 9, 1910.

1,028,944.

Patented June 11, 1912.
3 SHEETS—SHEET 2.

Witnesses:
Ira D. Perry
D. Lewis

Inventor:
Floyd D. Leach
By Buckley Durand Drury
Attys

F. D. LEACH.
FRICTION GEARING.
APPLICATION FILED MAY 9, 1910.

1,028,944.

Patented June 11, 1912.

3 SHEETS—SHEET 3.

Witnesses:
Ira D. Perry
A. Lewis.

Inventor:
Floyd D. Leach
By Buckley, Award & Drury
Attys.

UNITED STATES PATENT OFFICE.

FLOYD D. LEACH, OF CHICAGO, ILLINOIS.

FRICTION-GEARING.

1,028,944.  Specification of Letters Patent.  Patented June 11, 1912.

Application filed May 9, 1910. Serial No. 560,275.

*To all whom it may concern:*

Be it known that I, FLOYD D. LEACH, a citizen of the United States of America, and resident of Chicago, Cook county, Illinois, have invented a certain new and useful Improvement in Friction-Gearing, of which the following is a specification.

My invention relates to improvements in control for engines, and is well adapted for use with dental engines, and has for its object the production of a device by means of which the rate of revolution transmitted to the instrument may be varied in any desired degree.

A further object is the production of a device in which the lateral shifting of the transmission shaft operates to start or stop the motor and also determines the rate of speed transmitted.

A further object is the production of a device that is operable without being permanently attached to the motor, thus permitting the removal of the motor for other uses, without disturbing the regulating mechanism.

A further object is the production of a device of simple construction, one that can be cheaply constructed, and one that is not liable to get out of order.

These and such other objects as may hereinafter appear are attained by my device, embodiments of which are illustrated in the accompanying drawings, in which—

Figure 1:
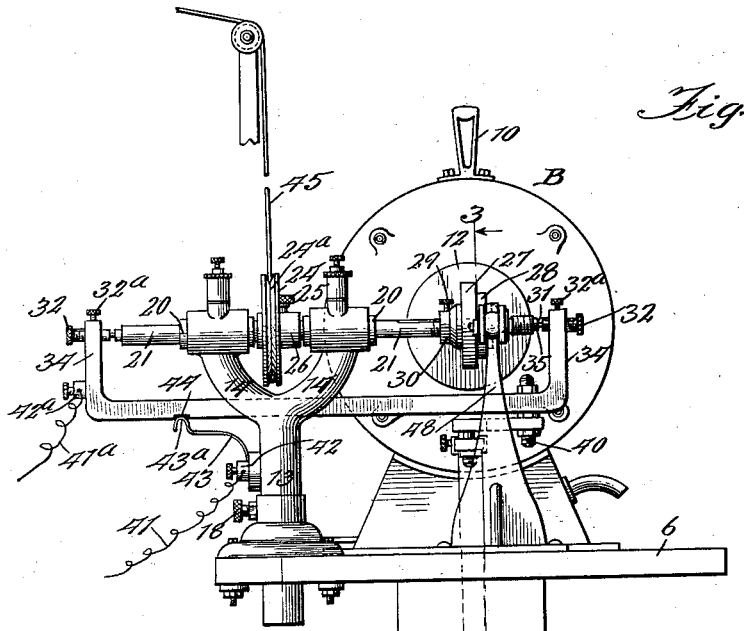
Figure 1:
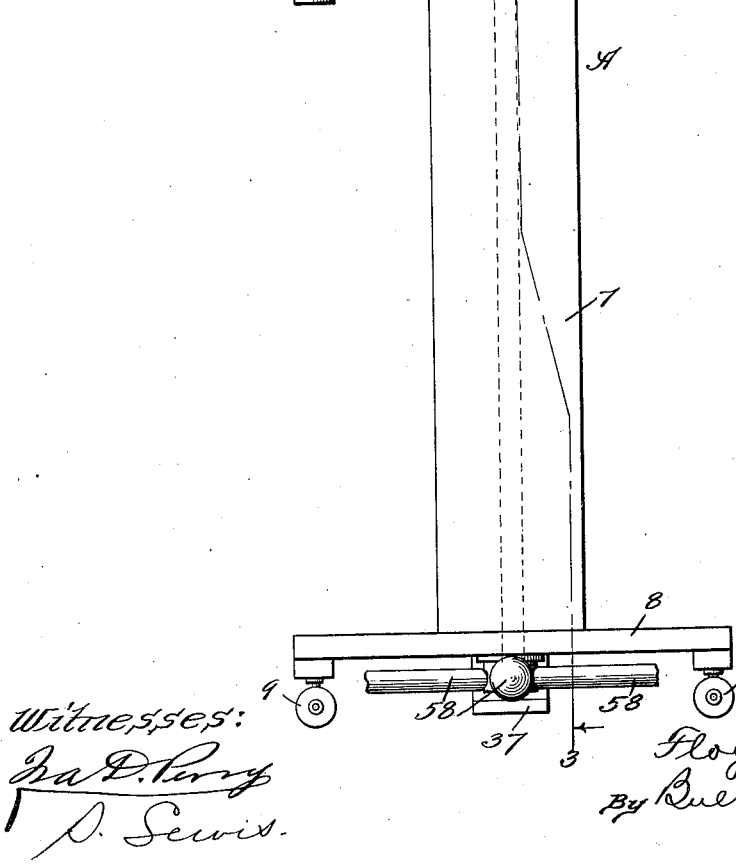
Figure 2:
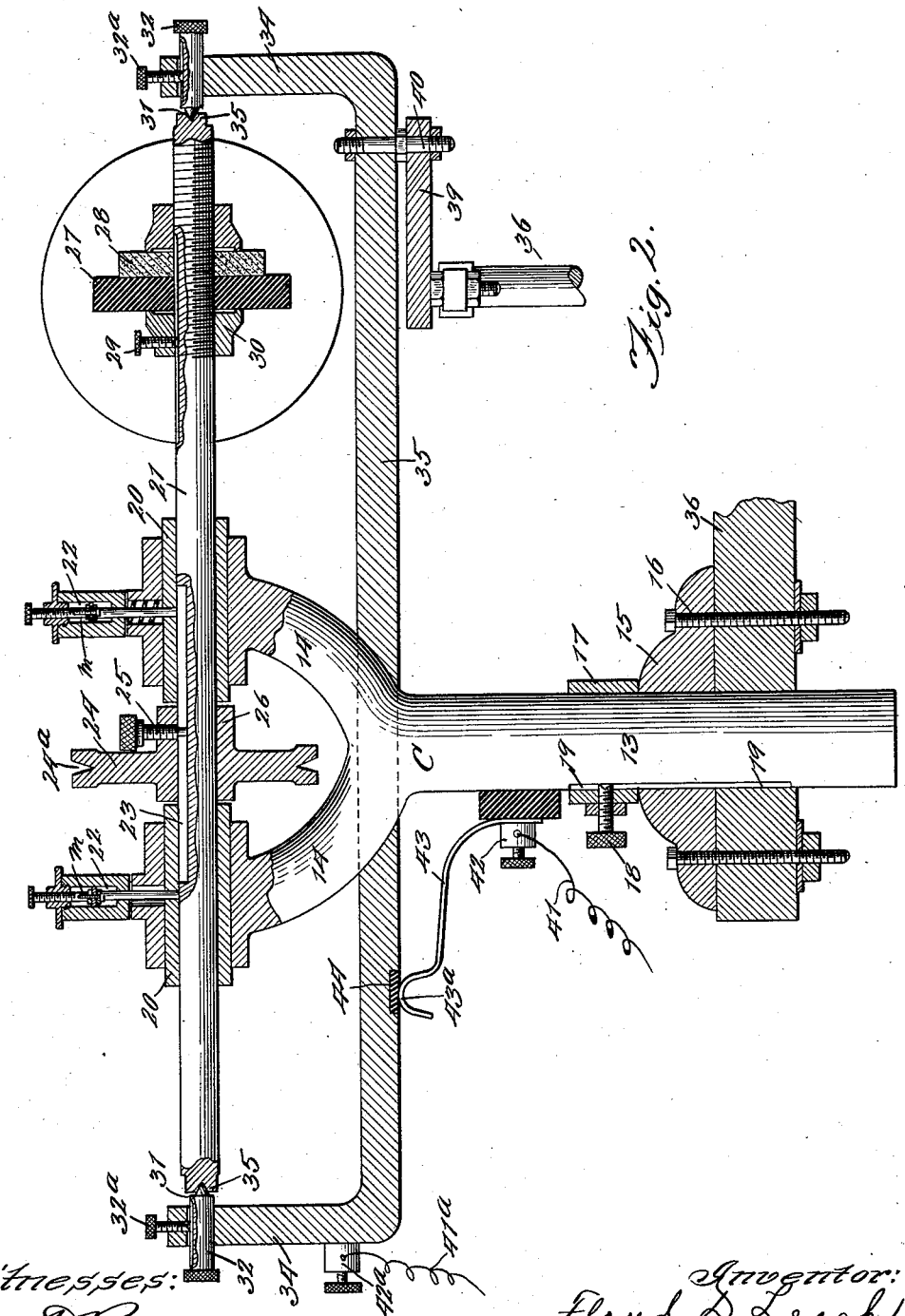
Figure 3:
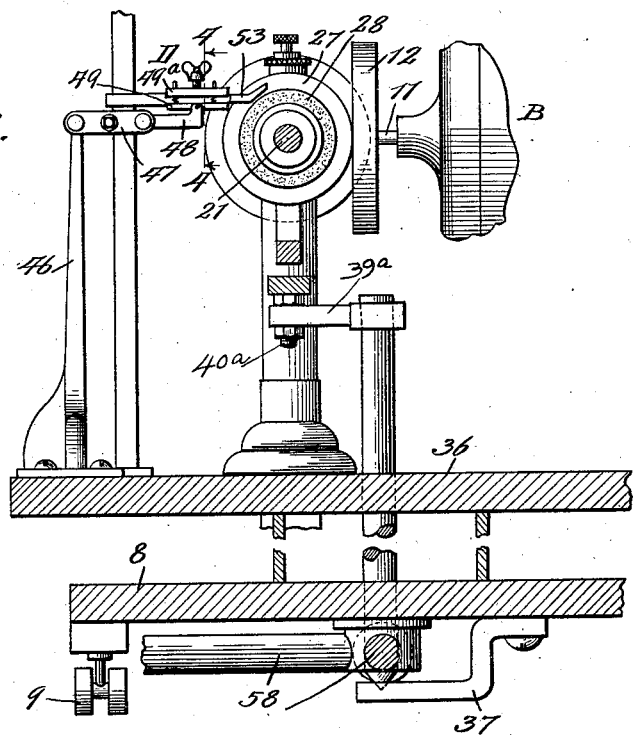
Figure 5:
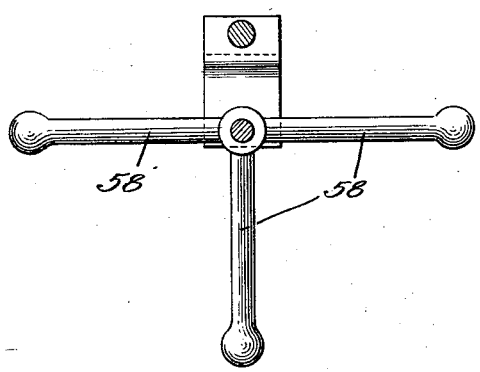
Figure 4:
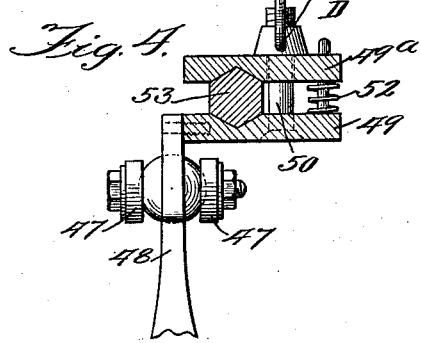

Figure 1 represents a front elevation of my device. Fig. 2 represents an enlarged sectional view of a portion of Fig. 1. Fig. 3 represents an enlarged sectional view on the line 3—3 of Fig. 1, looking in the direction indicated by the arrows. Fig. 4 represents an enlarged sectional view on the line 4—4 of Fig. 3, looking in the direction indicated by the arrows. Fig. 5 is a plan view of the shifting pedals.

Like numerals of reference indicate like parts in the several figures of the drawings.

Referring now to the drawings—A represents any suitable stand or support, comprising a top 6, a pedestal 7 and a base 8, preferably supported on casters 9. On the top 6 is placed a suitable electric motor B preferably provided with a handle 10, and on the shaft 11 is mounted a steel driving disk 12. A bearing yoke C comprising a stem 13 and yoke members 14 is mounted on the top 6. The shaft or stem 13 slides within the casting 15 bolted to the top by means of bolts 16, and is held in any desired vertical position by means of the fixed collar 17, a thumb-screw 18 passing through the collar and into a vertical groove or channel 19, and keeping the stem from turning when raised or lowered.

The yoke members 14 are provided with horizontal bores fitted with journal bearings 20 for the shaft 21. A suitable lubricating means is provided, such as boxes adapted for the use of hard oil. The shaft 21 is provided with a horizontal groove or channel 23, and a driving pulley 24 is mounted on said shaft between the yoke members and held against slipping by means of a pin 25 passing through the extended hub 26 of the driving pulley and into the groove 23. Mounted on the shaft 21 opposite the disk 12 and in such a position that its outer periphery engages the face of the disk is a friction wheel 27, preferably of rubber, and adjacent thereto is a second wheel or stone 28 of a less diameter than the wheel 27. The stone and wheel are held rigidly in any desired position on the shaft by means of a set-screw 29 passing through the hub or collar 30. The ends of the shaft 21 are formed with sockets 31 and pins 32 terminating in pivotal points 33, forming bearings for the shaft, are mounted on the upwardly extending members 34 of the movable frame 35. The bearing pins 32 are held in any desired position by means of the set-screw 32$^a$. This frame is mounted to pass within an opening in the upright C directly below the shaft. It will be evident that in order to effect a change in the horizontal position of the shaft, it is simply necessary to shift the position of the frame. This movement may be accomplished in any suitable manner. I have shown one method in which a vertical shaft 36 is pivotally mounted on a supporting casting 37 secured to the base 8.

A series of foot-levers 38 are rigidly mounted on this shaft at the bottom in convenient position to be operated by the foot. On the top of the shaft is rigidly mounted in any desired manner one end of a crank arm 39$^a$, the opposite end of which is connected to one end of the similar crank arm 39 by means of the bolt 40$^a$ the opposite end of this arm being supported on a bolt 40 passing through the frame 35. By shifting the position of the foot-lever the frame 35 carrying the shaft may be shifted horizontally in either direction. The frame 35 is preferably made of conducting material, and is in the motor circuit, through the medium of the connecting wires 41—41ª, binding posts 42—42ª and the spring 43. It will be noted that the spring 43 is bent so as to be at all times in contact with the frame 35. Inset in the frame is an insulating strip 44 and so placed that the end 43ª of the spring engages the insulation when the friction wheel 27 is at the center of the disk 12, thus breaking the current. The power is transmitted to the instrument by the operator in the usual manner, as, for instance, a belt or cord 45 fitting within the groove 24ª in the drive pulley 24.

Mounted on the table 6 is an upright 46 on the top of which is pivotally mounted a link rod 47 on the outer end of which is mounted an arm 48 carrying a tool support D. This support comprises a pair of parallel blocks 49—49ª. A bolt 50 unites the blocks 49—49ª provided at the top with a thumb-screw 51. A pair of spring members 52 are positioned between the blocks on one side and on the other side the inner faces of the blocks are cut away forming sockets for the reception of the shank 52 of a tool 53, the device being so positioned that the operative face of the tool may be brought in contact with the face of the stone 28 when it is desired to sharpen said tool.

In the operation of my device, when the motor is cut out, the frame 35 carrying the shaft 21 is in the position shown in Fig. 2, the end 43ª of the spring 43 resting on the insulation 44 and the friction wheel 27 at the center of the disk 12. A slight movement of the pedal shifts the frame 35 bodily, the shaft 21 sliding within the bearings 20. The lateral movement of the frame carries the insulation 44 out of engagement with the spring 43 and establishes a circuit starting the motor. The friction disk 27 leaves the center of the disk 12, and commences to rotate, carrying the shaft and drive pulley 24.

Any desired speed may be obtained by shifting the position of the wheel 27 on the face of the disk 12, and the motor can be shut off at any time by restoring the frame to its normal position.

It will be noted that by mounting the shaft in the support C and permitting a sliding motion by the moving of the frame 35, I attain great stability and produce a device that is capable of performing the most effective service. The motor B is arranged on the stand so that the disk 12 engages the friction wheel 27, but I do not find it necessary to bolt or screw it in place, as its weight is sufficient to keep it in position. However, in the event that it is desired to use the motor for any other purpose or in any other position, it can be lifted out of its place without disturbing any of the other mechanism.

While I have shown one form of mechanism for shifting the position of the frame, I do not limit myself to such form, as it is evident that any suitable means of moving the friction wheel over the driving disk may be employed without departing from the spirit of my invention.

If desired, the motor may be shifted out of contact with the friction wheel by any well known means, at any time, thus stopping the operation of the device without cutting off the current.

I claim:

1. In a device of the class described, the combination of a motor, a driving disk mounted thereon, a movable frame adjacent thereto, a shaft mounted at its ends in said frame, a bearing for said shaft independent of said frame, a friction disk rigidly mounted on said shaft and adapted to be brought in frictional engagement with said driving disk, and means for shifting the lateral position of said frame whereby the friction disk is caused to travel over the face of said driving disk.

2. In a device of the class described, the combination of a motor, a driving disk mounted thereon, a movable frame adjacent thereto, a shaft mounted at its ends in said frame, a bearing for said shaft independent of said frame, a friction disk rigidly mounted on said shaft and adapted to be brought in frictional engagement with said driving disk, and foot-operated means for shifting the lateral position of said frame whereby the friction disk is caused to travel over the face of said driving disk.

3. In a device of the class described, a suitable stand, a motor provided with a driving disk mounted on said stand, a shaft support rigidly mounted on said stand, a shaft mounted to slide within bearings on said support, a friction disk rigidly mounted on said shaft and adapted to be brought in frictional engagement with the face of said driving disk, a movable frame within which the ends of said shaft are pivotally mounted, and means for shifting the lateral position of said frame, thereby sliding said shaft within its bearings and causing said friction disk to travel over the face of the driving disk.

4. In a device of the class described, a suitable stand, a motor provided with a driving disk mounted on said stand, a shaft support rigidly mounted on said stand, a shaft mounted to slide within bearings on said support, a driving pulley mounted on said shaft whereby power may be transmitted from said motor, a friction disk rigidly mounted on said shaft and adapted to be brought in frictional engagement with the face of said driving disk, a movable frame within which the ends of said shaft are pivotally mounted, and means for shifting the lateral position of said frame, thereby sliding said shaft within its bearings and causing said friction disk to travel over the face of the driving disk.

5. In a device of the class described, a suitable stand, a motor provided with a driving disk mounted on said stand, a shaft support rigidly mounted on said stand, a shaft mounted to slide within bearings on said support, a friction disk rigidly mounted on said shaft and adapted to be brought in frictional engagement with the face of said driving disk, a movable frame within which the ends of said shaft are pivotally mounted, means for shifting the lateral position of said frame, thereby sliding said shaft within its bearings and causing said friction disk to travel over the face of the driving disk, and means whereby the shifting of said frame from a predetermined position closes an electrical circuit and starts said motor.

6. In a device of the class described, the combination of a motor, a driving disk mounted thereon, a movable frame adjacent thereto, a shaft mounted at its ends in said frame, a driving pulley mounted on said shaft whereby power may be transmitted from said motor, a bearing for said shaft independent of said frame, a friction disk rigidly mounted on said shaft and adapted to be brought in frictional engagement with said driving disk, and means for shifting the lateral position of said frame whereby the friction disk is caused to travel over the face of said driving disk.

Signed by me at Chicago, Illinois, this 6th day of May, 1910.

FLOYD D. LEACH.

Witnesses:
  Wm. B. Durnion,
  J. Norby.

Copies of this patent may be obtained for five cents each, by addressing the "Commissioner of Patents, Washington, D. C."